July 15, 1969     J. HENRY-BAUDOT     3,456,144
PRINTED-CIRCUIT MULTILAYER WINDING FOR
ELECTRIC ROTARY MACHINES Filed Dec. 2, 1966     4 Sheets-Sheet 1

INVENTOR
JACQUES HENRY-BAUDOT
BY Kenyon, Palmer, Stewart & Estabrook
ATTORNEYS

INVENTOR
JACQUES HENRY-BAUDOT

ATTORNEYS

INVENTOR

JACQUES HENRY-BAUDOT

ATTORNEYS

July 15, 1969  J. HENRY-BAUDOT  3,456,144
PRINTED-CIRCUIT MULTILAYER WINDING FOR
ELECTRIC ROTARY MACHINES
Filed Dec. 2, 1966  4 Sheets-Sheet 4

INVENTOR
JACQUES HENRY-BAUDOT
BY *Kenyon, Palmer, Steward & Estabrook*
ATTORNEYS

United States Patent Office 3,456,144
Patented July 15, 1969

3,456,144
PRINTED-CIRCUIT MULTILAYER WINDING FOR ELECTRIC ROTARY MACHINES
Jacques Henry-Baudot, Antony, France, assignor to Printed Motors, Inc., New York, N.Y.
Filed Dec. 2, 1966, Ser. No. 598,771
Claims priority, application France, Sept. 20, 1962, 909,988; Sept. 8, 1966, 75,627
Int. Cl. H02k 1/22
U.S. Cl. 310—268     3 Claims

ABSTRACT OF THE DISCLOSURE

An armature for an electrical rotating machine is formed of two or a multiple of two printed circuit layers on discs, the conductors in alternate layers being reversely oriented and the conductors being interconnected so as to form a single uninterrupted series wave winding.

---

This application is a continuation-in-part of my co-pending application Ser. No. 300,287 filed Aug. 6, 1963, now U.S. Patent 3,296,474.

The present invention concerns improvements in or relating to windings made of printed-circuit conductors for electric rotary machines wherein they act mainly as armatures. By "printed-circuit" conductors, it is intended to include any conductors and circuits made of flat and thin conductors bonded to an insulating surface and formed by any technique producing repetitive patterns of electrical conductors on insulating surfaces.

In such machines, whether with axial or radial magnetic airgaps, such armature windings are located entirely within the said airgaps and in view of increasing the overall efficiency from an electrodynamic point of view, it has already been proposed to make multilayer windings by stacking two-face windings together and providing certain interconnections between their conductors. However, for instance in French Patent No. 1,236,528 filed Apr. 30, 1959, in the name of Normacem, it has been provided to stack and interconnect two windings, one of the series-wave type and the other one of the lap wound type so that the electrical circuit comprises several spirals of the lap wound winding connected between the turns of the series-wave winding. For making such a "sandwich," applicant has further provided a method of interconnection disclosed in French Patent No. 1,256,632 filed Feb. 9, 1960, in the name of Societe d'Electronique et d'Automatisme, applicable to disc-shaped sandwiches as well as to cylindrical ones such as known under the generic denomination of Brown armatures.

Such multilayer windings, however, present a drawback from a mass-production standpoint in that they need at least two distinct patterns of the half-turn conductor layers, one for the series-wave winding and the other one for the lap wound winding. An object of the present invention is to avoid such a drawback and to provide a multilayer winding of printed circuit conductors necessitating a single pattern for each and any face of the sandwich, and consequently a single master drawing for the printing operations of such a sandwich. It is a further object of this invention to provide such a multilayer winding utilizing patterns of the series-wave type only for each winding thereof.

In a printed-circuit conductor winding, the conductors adhere to an insulated carrier and their ends to be interconnected comprise peripheral rows of terminals near the edges of said carrier. The circuit of such a winding follows successive spirals wherein the half-turn conductors are alternately on one face and the opposite face of said carrier, the half-turn conductors of each pair of successive conductors on opposite faces substantially encompassing an area corresponding to the area of a magnetic pole of the field structure. This series of spirals after a number of paths on the carrier, which is a function of the number of the conductors per pole and consequently of the number of poles provided in the machine embodying such winding, is connected to form a closed winding circuit pattern. In known multilayer windings, each elementary winding is made complete in itself prior to the assembly of the sandwich. In contradistinction thereto, it is an object of this invention so to provide windings of multilayer printed circuit conductors which are to be completed only after assembly of the layers is completed.

In accordance with the present invention each layer of a multilayer armature has an identical pattern of conductors. There are always an even number of layers and while the specific embodiment hereinafter described relates to a four-layer assembly, it will be apparent to those skilled in the art that the number of layers may be increased to any desired number in multiples of two. While the pattern of conductors on each layer is identical, those on opposite faces of the same insulating member are reversed in orientation. In a four-layer winding, end portions of the conductors at one edge of the first and fourth layers and end portions at one edge of the second and third layers are electrically interconnected. Likewise, the end portions of the conductors at the other edge of the first and second layers and the end portions of the conductors at the other edge of the third and fourth layers are electrically interconnected with the result that the thus interconnected layers form a series wave form winding, the series circuit of which passes from layer to layer in succession. There is thus defined a single uninterrupted series wave winding.

In order to detail the invention, reference will be made to an illustrative embodiment thereof from which any variation can be deduced for other number of conductors and pitches as well as for other number of elementary windings. In order to simplify the drawings, this example relates to a disc-shaped winding for an axial airgap machine, but the adaptation to a cylindrical winding for radial airgap machine is obvious per se, from mere anamorphosis of flat and circular surfaces to cylindrical surfaces.

In the accompanying drawings, FIG. 1 shows a somewhat simplified cross-section of a multilayer armature machine;

Figure 1:
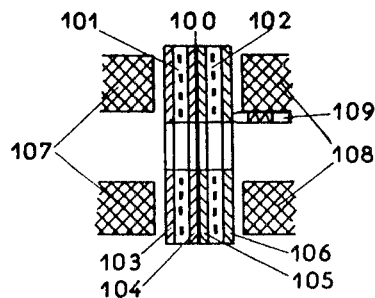

As shown in FIG. 1, the example of multilayer winding concerned comprises two elements, one comprising the layers of conductors 103 and 104 bonded on the opposite faces of an insulating sheet 101, the other one comprising the conductor layers 105 and 106 bonded on the opposite faces of an insulating sheet 102. These elementary windings are assembled together by a film adhesive layer 100. Interconnections must be made between the layers of each elementary winding as well as between said elementary windings. Such an armature may be mounted between, for instance, two sets of magnetic poles such as 107 and 108. One of said sets of poles may be replaced by a mere magnetic yoke for closing the flux from the remaining field magnet arrangement. Brushes such as 109 can be applied against at least one face of the armature for translating current thereto.

Figure 2:
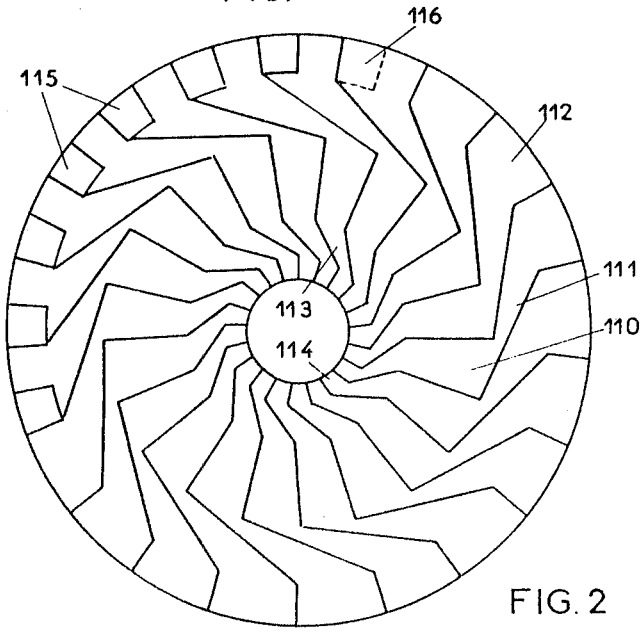
FIG. 2 is a front view of the master drawing for printing any face of the winding.

The described and shown example comprises eighty-four conductors, consequently twenty-one conductors per layer or face. It is designed for a six-pole machine. Each layer of winding conductors, except for the interconnections is identical in each of said four layers and the pattern is shown on FIG. 2. Each half-turn conductor comprises for instance a mid-portion 110 extended at both ends by slanted portions 111 and 113 ending in terminals 112 and 114. Seven of said terminals, for instance at the outer edge, are subdivided on one-half of their radial angular span for defining thereat such separate conductor areas 115. An eighth terminal might also be subdivided for defining a further separate conducting area as shown in dot line at 116.

Figure 4:
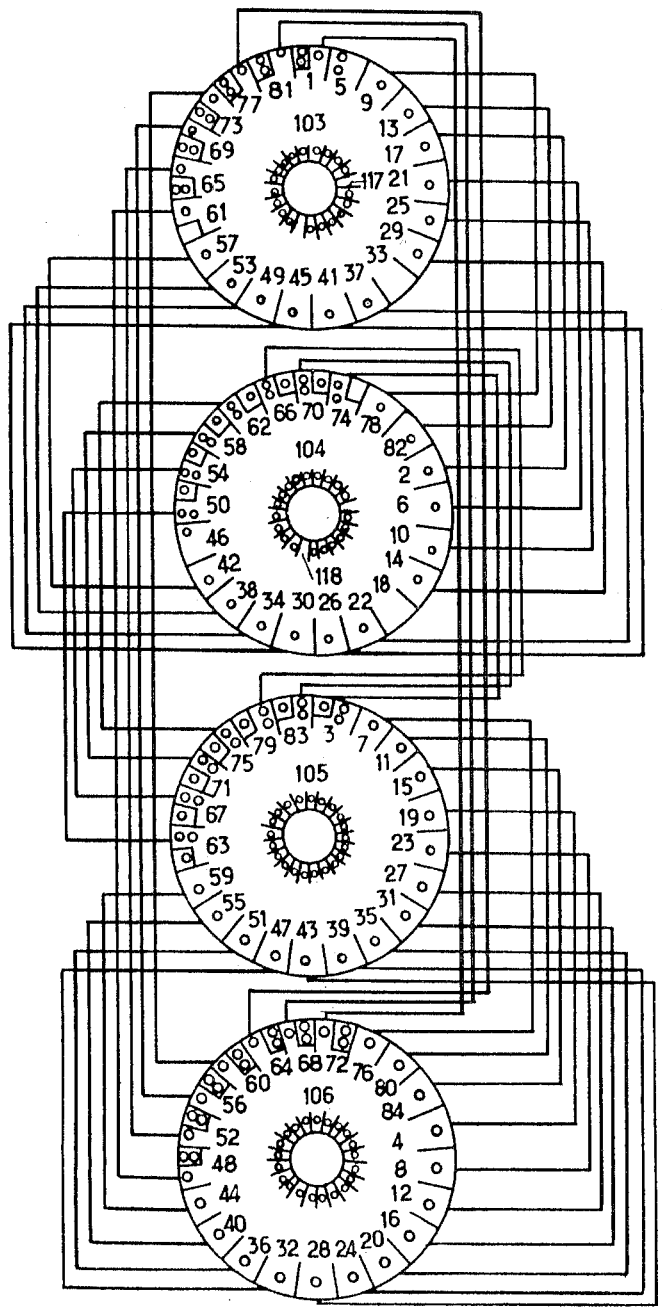
FIG. 4 shows a schematic view of the interconnections between the four faces of said elementary two winding armature.

The four layers of half-turn conductors are shown on FIG. 4 with a numbering of the terminals corresponding to the location of the half-turn conductors in the complete four face pattern. These faces or layers are shown one under the other in FIG. 4 for the sake of clarity of the explanation. Their relative positions in the sandwich are indicated. The conductors are only indicated by their end terminals and it is to be understood that the orientation of the slanted portions of the conductors are reversed from one layer to the other one, from layer 103 to layer 104 and from layer 105 to layer 106. The orientations are the same in layers 103 and 105 on the first part, in layers 104 and 106 on the other part.

Figure 3:
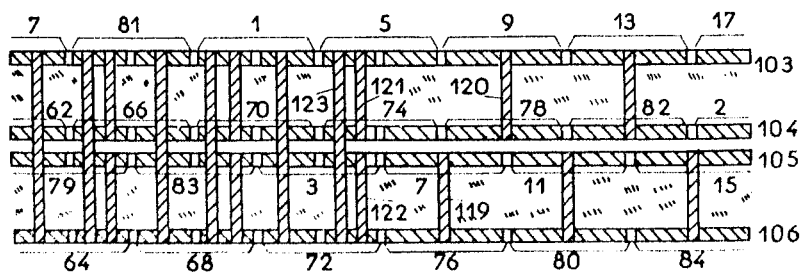
FIG. 3 is a partial cross-section view, linearly developed for the sake of simplicity, of the elementary two winding armature of the example.

The interconnections are shown in the diagram of FIG. 4 external to the layers in order to clearly follow them. It is to be understood that such interconnections are made by the hole metallization technique and, for better understanding these interconnections, one will refer to the cross-section view of FIG. 3, assumed to be taken along one outer edge of the sandwich at the place of the interconnections in a developed planar view. Any plain interconnection between conductors in layers 103 and 104 can be made in the middle of the registering terminals such as for instance connection 120 between conductors 9 and 78 as shown in FIG. 3. Similar simple connections are established in layers 105 and 106 such as for instance connection 119 between conductors 7 and 76. For connecting together two conductors of the layers 104 and 105, two steps are necessary: first connections are made between separate divisions of extreme faces 103, respectively 106, to the terminals of the intermediary faces 104 and 105, respectively, as shown for instance for connection 121 between 5 and 74 in the upper elementary winding and for connection 122 between 3 and 72 in the lower elementary winding; secondly, and after assembly of the elementary windings, through-connections are made through the sandwich between the registering extreme areas, see for instance connection 123 connecting the separate conductive area of terminal 5 to the separate conductive area of terminal 72. As explained by the patent of Societe d'Electronique et d'Automatisme which has been referred to, such a connection as 123 cannot definitely connect the intermediate conductive areas through which it passes, and such double connections are necessary for obtaining a safe electrical connection between extreme terminals in a sandwich, themselves safely connected to corresponding intermediate terminals in such a sandwich. After the assembly, through-connections may be made for connecting conductive areas on the opposite faces of the sandwich, such as shown for instance between parts of terminals 81 and 68 and accordingly the intermediate conductive areas passed through by such a connection will not be electrically connected to said opposite face areas.

In FIG. 4, no connections are provided in the inner rings of terminals between 117, layer 103 and 118, layer 104, and in the outer rings of terminals between 33, layer 103 and 18, layer 104. Consequently no connections exist between conductors 5 and 18, 18 and 33, and 33 and 46 for reasons which will be explained below.

The layer 103 comprises conductors 1, 5, 9, . . . 81; the conductors 5 to 57, inclusive, have undivided terminals, the conductors 61 to 1 have their terminals divided for providing conductive areas electrically separate from the conductors. The layer 104 comprises conductors 2, 6, . . . 82; the conductors 78 to 46 have undivided terminals, and the conductors 50 to 74 have terminals divided for providing conductive areas separate from said conductors. From layer 103 to layer 104 there exists an angular shift by one terminal in the registration of the subdivided ones of said terminals. The conductors of the layer 105 are numbered 3, 7, . . . 83 and the conductors of the layer 106 are numbered 4, 8, . . . 84. Terminals 63 to 3 are subdivided in layer 105, conductor terminals 48 to 72 are subdivided in layer 106. A shift of one-half terminal is provided between the elementary winding 103–104 and the elementary winding 105–106.

With the connections as indicated the winding diagram may be followed easily, the progression from conductor to conductor in passing from one face to the other at the outer edge being 13 and the progression from conductor to conductor in passing from one face to the other at the inner edge being 15 with repetition of the 13 progression when passing from one elementary winding to the other one. This diagram is as follows:

On the upper element, a first spiral passes from conductor 1, layer 103, to conductor 14, layer 104, to conductor 29, layer 103, to conductor 42, layer 104, to conductor 57, layer 103, to conductor 70, layer 104;

From the conductor 70, is reached the conductor 83 in layer 105, from repetition of the progression of 13 in passing from the upper to the lower elementary winding member; a second spiral then passes from 70 to 83, layer 105, to 12, layer 106, to 27, layer 105, to 40, layer 106, to 55, layer 105, to 68, layer 106;

Back to the first elementary winding member through the connection between 68 to 81, layer 103, a third spiral passes through conductors 81, 10, 25, 38, 53 and 66; from 66 the winding circuit passes to the lower elementary winding member, conductor 79 and the fourth spiral includes the series connection of conductors 79, 8, 23, 36, 51 and 64; from 64, the winding passes anew to the first elementary winding member whereon the fifth spiral includes the series connection of conductors 77, 6, 21, 34, 49 and 62; from 62 is reached conductor 75 of the lower elementary winding member whereon the sixth spiral comprises the series connection of conductors 75, 4, 19, 32, 47 and 60; from 60, the next spiral is traced on the upper member through conductors 73, 2, 17, 30, 45 and 58; from 58, the lower member is reached once more for a spiral comprising conductors 71, 84, 15, 28, 43 and 56; the ninth spiral starts from conductor 69 connected to 56 and its circuit passes through conductors 82, 13, 26, 41 and 54 from which, changing again of member, from 54 and 67, the following spiral presents a circuit through conductors 80, 11, 24, 39 and 52; conductor 52 is connected to conductor 65 and the following spiral passes through conductors 65, 78, 9, 22, 37 and 50, this latter connected to conductor 63 from which starts the twelfth and last spiral through conductors 76, 7, 20, 35 and 48.

From 48, the circuit passes again to the upper elementary winding member at conductor 61 connected to conductor 74 but, at this point, instead of tracing again a spiral on said upper member, the circuit passes immediately back to the lower member, conductor 3 and on this second member a further spiral is followed through 16, 37, 44, 47 and 72. Conductor 72 on layer 106 is through-connected to conductor 1, layer 103, which closes the complete winding pattern.

For the connection between 74 and 3, the terminal of conductor 5, layer 103 has been used without inconvenience since this conductor 5 is not connected to conductor 33 which, in turn, is not connected to conductor 46, the terminal of which is passed through by another connection. This means that in the complete winding member, four conductors are not used, which is without inconvenience in a series-wave patern. In conventional wiring of such patterns, it is usual to leave conductors if not "sections" dead. As a modification however, an eighth terminal has been divided as shown in dot line on FIG. 2 on each layer of conductors. In the assembly, such a terminal would occupy the position numbered as 5 in layer 103, 46 in layer 104 (which would bring back in registration of angular positions with respect to such divided terminals the layers 103 and 104), and the positions numbered 7 and 48 in layers 105 and 106. The connections between 103 and 104 would then be made at 117 and 118 and the connection between 103 and 104 would have been made between terminals 33 and 18. This would lead to a complete dead section from conductor 5 to conductor 46 when, in layers 105 and 106 the connections would be made from face to face in the divided areas remaining connected to the conductors of same numbering. Such a modification giving the same result as the completely described one, is obviously part of the invention too.

The above described example considers a winding having a recessive progression in that, starting from conductor numbered 1 a complete turn of a spiral would come back to the same conductor 1 on the first elementary winding member if a repetition of the progression of 13 had not been provided for passing to the second elementary winding member in the sandwich. Actually, the overall progression rate (outer plus inner progression rate) is made equal to $4n/p$, with $n$ denoting the number of conductors per layer and $p$ denoting the number of pairs of poles in the machine, identical to the number of double polar pitches. One might have used a progressive character winding instead, made equal to $(4n+4)/p$, whereby the first spiral would have ended at conductor 5 in the absence of a passage to the second member with a repetition of progression rate similar to the one disclosed for the recessive arrangement for a connection to conductor No. 3 of the second member; the next spiral would have then come back to conductor No. 5 of the first member, and so forth. It is then clear that the use of a progressive arrangement instead of a recessive one does not change the fashion of putting the invention into practice.

In all cases, the complete winding closes after a number of spirals on one elementary winding member equal to the number of odd conductors per double polar span, i.e., a number equal to $n/p$ (or the immediately superior integer number if $n$ is not divisible by $p$). In the final spiral there are $(2p-2)$ dead conductors, i.e., conductors not serially connected in the complete winding circuit. For $p=3$, which is the above disclosed example, there consequently were four dead conductors; for $p=4$, there would be six dead conductors, for $2=p$, two dead conductors, 0 dead conductors for a single pair of poles, and so forth.

More than two elementary winding members may be assembled in a sandwich according to the invention; for instance, considering three members, terminals would be subdivided into three conductive areas, one remaining connected to a conductor, the two others being separate from said conductor and from one another; the three members would be assembled with a relative angular shift of one-third of a terminal. For passing from one member to the next one, a rear layer conductor of the first member would be connected to a front conductor of the second, and a rear conductor of the second would be connected to a front conductor of the third member and, finally, a conductor on the rear face of the third elementary winding member would be connected to a front conductor of the first member, according to a uniform cycle of permutation of said members in the series circuit pattern of the complete winding.

The foregoing describes embodiments concerning printed circuits with connections from layer to layer made by the well known plated hole technique, the conductors being normally obtained by etching a stock sheet of conductive material (copper). The embodiment shown in FIGS. 5–10 shows how the invention may be carried into practice when the face-to-face connections are made by soldering, brazing or otherwise (for instance point electric welding) tabs of conductors extending beyond the ends of the conductors of half-turns of the winding pattern. This is mainly used, through not imperatively, when the half-turn conductors are made from a cutting or stamping process from stock sheets of conductive material.

Referring now to FIGS. 5–10, inclusive, the conductors are numbered as in FIGS. 1–4 with the addition of the reference character $a$. Each half-turn conductor ends at the inner periphery in a tab $114a$ of substantially radial orientation and at the outer periphery in a fork comprising two tabs $212a$–$213a$ equally substantially radial. Each tongue of each fork is of a width less than one half of the span of said conductor end. Such tabs or tongues will extend beyond an intermediate insulating carrier or layer (glue) when assembled as layers in the winding.

Figure 5:
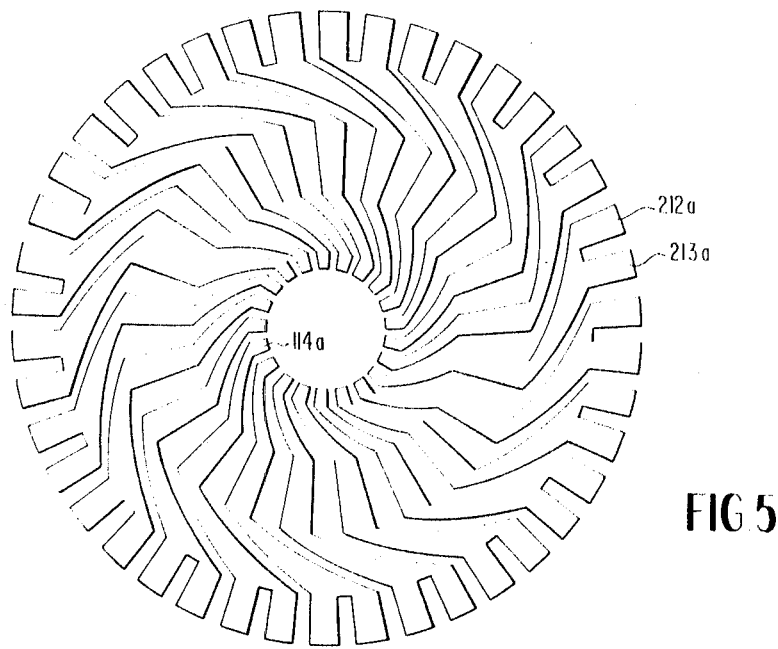
FIG. 5 shows a front view of a conductor layer, illustratively of the same number of conductors as in FIG. 2, which is obtained by cutting a set of half turn conductors from a copper sheet.
Figure 6:
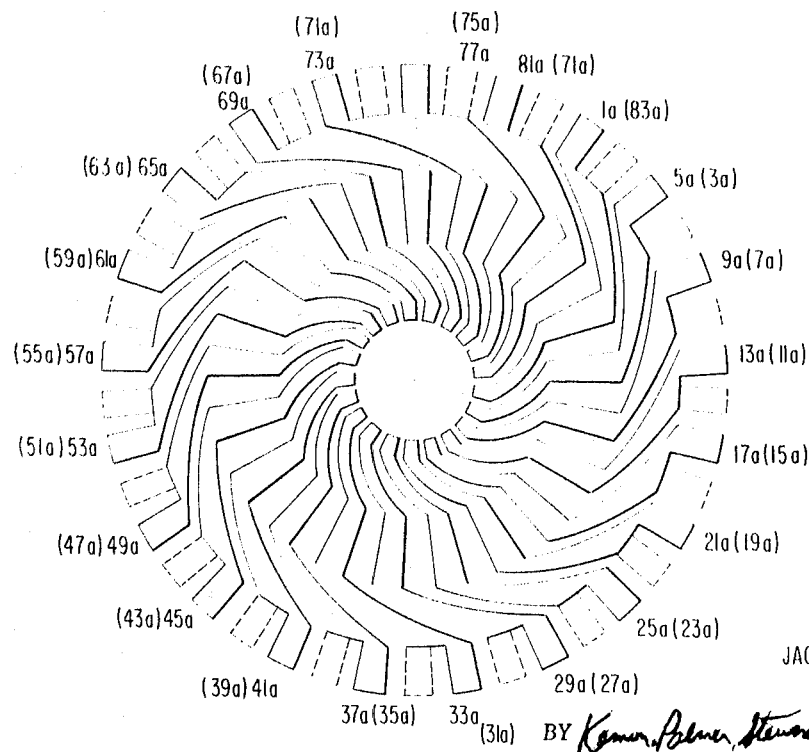
FIGS. 6 and 7 are views of layers of conductors derived from the layer of FIG. 5 in order to assemble in a four layer winding according to the invention.

The winding comprises four layers, numbered from I to IV. The layers I and III present the same orientation of the half-turn conductors; the layers II and IV, a reverse orientation with respect to that of layers I and III. Such change of orientation is merely obtained by reversing the layer such as the one of FIG. 5, i.e., taking it on the other face. For obtaining the final shape of layers I and III, it suffices to cut the outer tongues for removing one over two in each pair of tongues, as shown in FIG. 6; for instance, the right-hand tongue in each fork will be removed, when rotating clockwise. The remaining tongues are numbered as were the end tabs or terminals in FIGS. 1–4 but with the addition of the reference character $a$.

In layer I, the forks $5a$ and $33a$, corresponding to "dead" conductors in the circuit pattern, may further be advantageously removed too, though such removal is not imperative.

Figure 7:
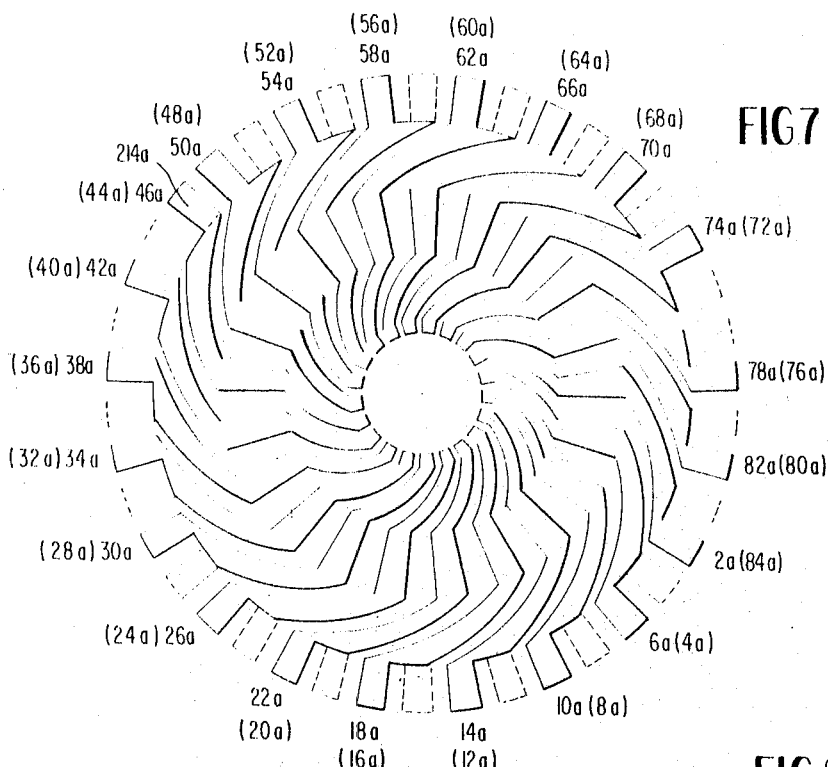

Concerning the layers II and IV, seven right-hand tongues of forks are preserved, the left-hand tongues of said forks being removed, see FIG. 7, and in the remaining end forks, the right-hand tongues are preserved, see also FIG. 7, such removals being described with reference to FIG. 5 before the layer is turned over for presentation as in FIG. 7. In layer II, however, it may be of advantage to further remove the fork $46a$, which is indicated by a dot line in FIG. 7.

Figure 8:
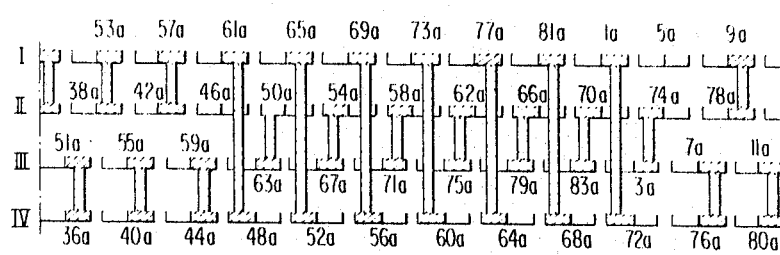
FIGS. 8 to 10 show views in partial cross-sections, of such a four layer winding, with varied methods of relative assembling of the layers.
Figure 9:
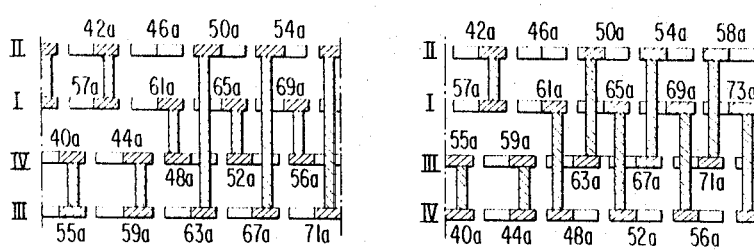
Figure 10:
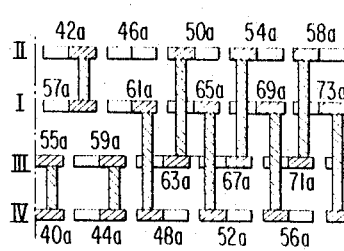

These four layers after having been thus prepared may be united according to varied arrangements and, for instance, according to any one of the arrangements shown in FIGS. 8 to 10. These figures are plain transpositions of FIG. 3 as will be apparent. The layers I and II are united with an intermediate carrier not shown, which may be reduced to a mere layer of glue or thermosetting resin for instance, or even without any glue provided their surfaces have been converted into an insulating compound (for instance, as known, copper conductors after dipped within the so-called "Ebanol" will be coated with insulating black copper oxide), the assembly being made from face-to-face connections of their inner tabs in registering positions from one layer to the other one. Layers III and IV are similarly treated. The layer I may be united to layer II in two ways, over layer II, see FIG. 8, or under layer II, see FIGS. 9 and 10; similarly, layer III may be united to layer IV either over layer IV, see FIGS. 8 and 10, or under layer IV, see FIG. 9. Thus one finally obtains two members, each comprising two conductor layers. Then, as previously described with reference to FIG. 4, said two-layer members are united with a shift by one half of a span of a half-turn conductor. It suffices to make the electrical face-to-face connections between the registering tongues at the outer periphery of the assembly to complete the electrical circuit of the winding pattern. In the drawings, each connection is shown as a conductor rod but one must understand that, in practice, each connection will solely consist of a solder, a brazure or the like, preferably an electrical spot welding connection, as the thicknesses are small and mainly those created by the relative insulations of the layers so that practically, the tongues come, at the uniting operation, substantially or nearly in reciprocal contact when placed between jaws of a spot welding machine for instance. In the drawing, the spacing has been exaggerated for the sake of clearness and for enabling the numerical references to be suitably inserted.

It is clear that from the operative point of view, when the winding is placed within a magnetic airgap, the relative positions of the layers in the pile of layers is without any importance. Hence, the winding may be made according to any one of the arrangements of FIGS. 8, 9 and 10, or in a similar fashion: for instance layer II might be placed between layers III and IV without preforming two layer members, provided however that the inner tabs or tongues are made at most one half as wide as the span between two conductor ends. In that case, all electrical connections will be made after the piling, as well at the inner as the outer peripheries.

Of course, the actual shape of the half-turn conductors may vary from the one which is shown mainly in order to better adapt to any desired conditions of use.

I claim:

1. A disc type armature comprising at least two pairs of layers of half-turn conductors arranged on two elementary winding members in each of which the layers are arranged on opposite faces of an insulating sheet and said members being stacked together with an insulating layer between them, wherein all conductor layers have an identical series-wave pattern with a number of terminals of said half-turn conductors adjacent to one another at one end of a corresponding number of such conductors subdivided into as many conductive terminal zones as there are winding members in the armature, one of said zones remaining connected to the corresponding conductor and the other or others being separated therefrom, said number being equal to the number of spirals of the circuit in each winding member, or to said number of spirals plus one, and wherein said winding members are assembled together with a relative shift equal to the span of each of the subdivided terminal zones, with systematic connections between the terminals which are not subdivided in each of the winding members for defining in the member spiral circuits each ending at a subdivided terminal thereof, and selectively made connections through the subdivided terminal zones for systematically passing from one member to the next one and back in the stack for each spiral circuit which would otherwise close in a winding member.

2. An armature according to claim 1, wherein the last followed spiral in the circuit relation of the conductors in a layer is interrupted for closing the circuit while leaving a number of unconnected dead conductors equal to twice the number of poles covered by the armature winding minus two.

3. An armature according to claim 2, such unconnected dead conductors being left deprived of face-to-face connection in the concerned winding member of the stack.

References Cited

UNITED STATES PATENTS

| 3,023,335 | 2/1962 | Burr | 310—268 |
|---|---|---|---|
| 3,046,427 | 7/1962 | Henry-Baudot | 310—268 |
| 3,096,455 | 7/1963 | Hahn | 310—268 |
| 3,109,114 | 10/1963 | Henry-Baudot | 310—268 |
| 3,227,903 | 1/1966 | Henry-Baudot | 310—268 |
| 3,296,474 | 1/1967 | Henry-Baudot | 310—268 |

WARREN E. RAY, Primary Examiner

R. SKUDY, Assistant Examiner